Patented Aug. 10, 1937

2,089,571

UNITED STATES PATENT OFFICE 2,089,571

RESIST FOR USE IN THE ETCHING OF GLASS

Floryan Polasik, Chicago, Ill., assignor of one-half to Casimir S. Wiczas, Chicago, Ill.

No Drawing. Application January 11, 1937, Serial No. 120,089

3 Claims. (Cl. 41—43)

This invention relates to a resist for use in the etching of glass and more particularly to a composition that may be spread upon the surface of glass to protect the coated surface thereof against the etching acid used in placing a design on the glass.

In the etching of glass, one of the commonly known processes includes the production of the design on a silk screen, either by a mechanical or photographic process, and then coating through the screen onto the glass surface with an acid resist, the portions of the surface to be protected from the etching action of the acid. Compositions heretofore used for the resist have not proved entirely satisfactory, since they have not had the necessary properties to permit the obtaining of a fine accuracy in the production of elaborate designs on the glass. Some of the heretofore used compositions tend to clog the fine silk screen, so that they cannot be used in the production of more than a few designs without necessitating the cleaning of the screen. Others give too hard a coat, or one that has a tendency to fracture easily and give rough outlines.

The resist of the present invention comprises a pasty mixture which, when diluted and spread upon a glass surface, dries to form a dense, non-tacky coating that adheres well to the glass and gives accurate, well defined outlines to the design which is to be placed on the glass. My composition lends itself readily to fast and accurate work, since it does not tend to clog the silk screen and therefore permits the use of the same screen for hundreds of reproductions of the same design. An added advantage in the use of my composition is that it dries to a film or coating that can be readily removed by the use of hot water alone, thus eliminating the necessity of using solvents.

It is therefore an important object of this invention to provide a composition for use as a resist in the etching of glass, the ingredients of which are so selected and proportioned as to form a coating on the glass that is non-tacky and closely adherent to the glass and that will permit of the accurate reproduction of designs with a high degree of faithfulness.

It is a further important object of this invention to provide a composition for use as a resist in the etching of glass which is applied as a coating that can be removed readily by the application of hot water alone and does not require the use of solvents.

Other and further important objects of this invention will become apparent from the following description and appended claims.

The composition of this invention is used as a resist in the etching of glass with an acid, such as hydrofluoric acid. The composition lends itself admirably to application to the glass surface through a screen, such as a silk, copper or organdie screen, that has the design or lettering formed thereon either mechanically or by a photographic process.

A preferred formula of my composition, in which parts are expressed as parts by weight, is as follows:

| | Parts |
|---|---|
| Rosin, such as WW gum rosin (powdered) | 2 |
| Pure yellow beeswax | 6–7 |
| Hard white paraffin wax | 7–8 |
| Egyptian asphaltum | 10 |
| Light chrome yellow ground in japan drier | 16 |
| Spar varnish or any pure gum varnish | 3 |
| Turpentine | 3 |
| Tallow (kidney suet) | 0.5 |

It will be understood of course that my invention is not limited to the exact proportions and ingredients given in the foregoing formula. In place of WW gum rosin, other high grade wood or gum rosins may be used, and any asphalt may be used in place of Egyptian asphalt. Similarly, any other paint than light chrome yellow may be used if finely milled, preferably ground in a japan drier. Various fats may be substituted in place of the tallow in the formula.

In its essential features, my composition comprises a pasty mixture of rosin, wax, asphaltum, a fat and a pigment in an oily vehicle. If desired, any suitable drier, such as cobalt or manganese oleate, may be added to impart quicker drying properties to the mixture. The function of the rosin is that of combining and holding together the other ingredients in the composition. The beeswax serves primarily as a resist, but should be present in substantially equal proportions with the paraffin wax, since if more beeswax is used than paraffin wax, there is a tendency of the composition to stick and to clog the screen.

The paraffin wax also serves as a resist but is not satisfactory by itself, since it does not stick sufficiently closely to the glass nor does it permit of a sufficiently accurate reproduction of any given design.

The asphaltum imparts softness to the composition, as does also the tallow. The turpentine acts as a solvent or thinner to produce a substantially plastic or pasty mass that does not dry out readily in a container.

In the use of my composition, it is diluted, if not already in a diluted form, with turpentine, and/or varnish or other thinner, or vehicle, to the desired consistency. After dilution, the composition is applied to the glass through a suitable screen carrying the design in solid or impermeable portions of the screen. A convenient way of applying the composition through the screen is by means of a squeegee. After the composition has been applied to the surface of the glass, the screen is removed and the composition allowed to dry to a dense, non-tacky, coating that adheres well to the glass. The remaining portions of the glass that are not to bear the design are coated with paraffin wax and the glass is then preferably immersed in the etching acid.

By immersing the glass as a whole in the etching acid, the action is much more rapid than if the acid is merely spread over the surface of the glass that is to be etched. The reason for this is that in immersing the glass in the etching acid, the surface on which the design is placed is suspended face down in the etching acid so that the acid acts continuously upon the exposed surface of the glass, whereas, if the acid were merely laid upon the surface of the glass to be etched, the products of reaction between the acid and the glass would collect and accumulate and thus retard the rapid action of the acid. My composition is sufficiently resistant to the action of the etching acid to permit its exposure to the acid over long periods of time without any penetration of the coating occurring.

After the design has been etched, the coating may be removed by washing off the glass with hot water. This is made possible through the choice of ingredients having a relatively low melting point. The use of relatively expensive solvents is thus eliminated and the task of removing the resist greatly simplified.

I am aware that numerous details of the process may be varied through a wide range without departing from the principles of this invention, and I, therefore, do not purpose limiting the patent granted hereon otherwise than necessitated by the prior art.

I claim as my invention:

1. A composition for protecting the surface of glass in the acid etching thereof, capable when diluted and spread upon a glass surface of drying to a dense, non-tacky adherent film, said composition having the following formula expressed in parts by weight:

| | Parts |
|---|---|
| Rosin | 2 |
| Beeswax | 6–7 |
| Paraffin wax | 7–8 |
| Asphalt | 10 |
| Pigment | 16 |
| Varnish | 3 |
| Turpentine | 3 |
| Fat | 0.5 |

2. A composition for protecting the surface of glass in the acid etching thereof in the form of pasty mass capable when diluted and spread upon a glass surface of drying to a dense, non-tacky adherent film, said composition having the following formula expressed in parts by weight:

| | Parts |
|---|---|
| Rosin | 2 |
| Beeswax | 6–7 |
| Paraffin wax | 7–8 |
| Egyptian asphaltum | 10 |
| Light chrome yellow ground in japan drier | 16 |
| Varnish | 3 |
| Turpentine | 3 |
| Tallow | 0.5 |

3. A composition for use as a resist in the etching of glass and the like, said composition being in the form of a pasty mass capable when diluted and spread upon a glass surface of drying to a dense, non-tacky adherent film, and consisting of the following ingredients, in substantially the proportions indicated as parts by weight:

| | Parts |
|---|---|
| Rosin | 2 |
| Beeswax | 6–7 |
| Paraffin wax | 7–8 |
| Asphalt | 10 |
| Pigment | 16 |
| Varnish | 3 |
| Turpentine | 3 |
| Fat | 0.5 | and a drier in an effective amount.

FLORYAN POLASIK.